United States Patent
Ramesh et al.

(10) Patent No.: US 9,430,526 B2
(45) Date of Patent: Aug. 30, 2016

(54) METHOD AND SYSTEM FOR TEMPORAL AGGREGATION

(75) Inventors: Bhashyam Ramesh, Secunderabad (IN); Manjula Koppuravuri, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 546 days.

(21) Appl. No.: 12/240,019

(22) Filed: Sep. 29, 2008

(65) Prior Publication Data

US 2010/0082705 A1  Apr. 1, 2010

(51) Int. Cl.
*G06F 7/00* (2006.01)
*G06F 17/30* (2006.01)

(52) U.S. Cl.
CPC ... *G06F 17/30471* (2013.01); *G06F 17/30463* (2013.01); *G06F 17/30466* (2013.01); *G06F 17/30489* (2013.01); *G06F 17/30498* (2013.01); *G06F 17/30551* (2013.01)

(58) Field of Classification Search
CPC .................. G06F 17/30463; G06F 17/30466; G06F 17/30498
USPC ................................ 707/713, 714, 715, 718
See application file for complete search history.

(56) References Cited

U.S. PATENT DOCUMENTS

| | | | |
|---|---|---|---|
| 5,440,730 A * | 8/1995 | Elmasri et al. | |
| 5,884,299 A * | 3/1999 | Ramesh et al. | |
| 6,046,740 A * | 4/2000 | LaRoche et al. | 715/764 |
| 6,324,535 B1 * | 11/2001 | Bair et al. | 345/419 |
| 6,442,543 B1 * | 8/2002 | Snodgrass et al. | |
| 6,665,670 B2 * | 12/2003 | Winer et al. | |
| 7,725,455 B1 * | 5/2010 | Shatdal | 707/713 |
| 2002/0174131 A1 * | 11/2002 | Winer et al. | 707/102 |
| 2004/0117359 A1 * | 6/2004 | Snodgrass et al. | 707/3 |
| 2005/0050030 A1 * | 3/2005 | Gudbjartsson et al. | 707/3 |
| 2005/0071217 A1 * | 3/2005 | Hoogs et al. | 705/10 |
| 2006/0026130 A1 * | 2/2006 | Botzer et al. | 707/3 |
| 2006/0026498 A1 * | 2/2006 | Hays et al. | 715/503 |
| 2006/0041597 A1 * | 2/2006 | Conrad et al. | 707/200 |
| 2006/0085488 A1 * | 4/2006 | Kitsuregawa et al. | 707/200 |
| 2006/0221077 A1 * | 10/2006 | Wright et al. | 345/428 |
| 2007/0202504 A1 * | 8/2007 | Morishita et al. | 435/6 |
| 2007/0242098 A1 * | 10/2007 | Sudo et al. | 347/40 |
| 2008/0077656 A1 * | 3/2008 | Broda | 709/203 |
| 2009/0063469 A1 * | 3/2009 | Gross | 707/5 |
| 2009/0063518 A1 * | 3/2009 | Jung et al. | 707/100 |
| 2009/0164943 A1 * | 6/2009 | Ryan et al. | 715/810 |
| 2010/0057706 A1 * | 3/2010 | Zhou | 707/4 |

OTHER PUBLICATIONS

Ye, X.; Keane, J.A.; , "Processing temporal aggregates in parallel," Systems, Man, and Cybernetics, 1997. Computational Cybernetics and Simulation., 1997 IEEE International Conference on , vol. 2, No., pp. 1373-1378 vol. 2, Oct. 12-15, 1997 doi: 10.1109/ICSMC. 1997.638165 URL: http://ieeexplore.ieee.org/stamp/stamp.jsp?tp= &arnumber=638165&isnumber=13802.*

* cited by examiner

*Primary Examiner* — Mark E Hershley
(74) *Attorney, Agent, or Firm* — Ramin Mahboubian

(57) ABSTRACT

A method, database system and computer program are disclosed for optimizing a SQL query, in which the SQL query seeks to aggregate temporal database information. The method includes determining whether two rows of information have a common grouping value, and if so, determining both temporal overlap and temporal non-overlap components of the two rows, aggregating each of the temporal overlap components of the two rows, and separating the temporal non-overlap components of the two rows.

12 Claims, 9 Drawing Sheets

METHOD AND SYSTEM FOR TEMPORAL AGGREGATION

BACKGROUND

Relational database systems store data in tables organized by columns and rows. The tables are typically linked together by "relationships" that simplify the storage of data and make complex queries against the database more efficient. Structured Query Language (SQL) is a standardized language for creating and operating on relational databases.

In some cases, databases are arranged such that data in each row of a table is associated with a particular time period. For example, a retail store may wish to keep track of employees and their sales performance over a period of time. To do so, they may set up a database table, where each row of the table contains an element "x" (where "x" may hold the name of the employee), and an element "y" (where "y" represents the total number of sales for a particular product over a defined period of time, such as a day, week, month, etc.) and the elements x, y may be associated with a "start date" and an "end date". This allows a user to know that employee "x", had sales figures "y" over a defined period of time.

This type of database is generally termed a "temporal database", and the term "temporal grouping" refers to a process where like elements that share a common or overlapping time-line (or part of a common time-line) are grouped. For example, a user may wish to perform a query on the database to determine all employees working in the store over a particular month, and their accumulated sales figures for the month. This would require the database to collate all employees who worked during the specified time period, as well as aggregating the total sales for each employee over the specified time period. That is, in addition to grouping, aggregate values may also need to be computed over given time intervals. To extend the simple example given above, the "grouping element" or "grouping value" is "x", the employee name, since all instances of the employee sales must be collated. The value to be aggregated is "y", namely the total number sales by the employee.

The manner in which such data is stored in the database (i.e. "partitioned" in the database) may vary drastically from the manner in which a user query is structured. For example, the data partitioning width or partitioning distance (i.e. the time period defined by the start date and the end date) for each data row may vary.

When a user requires an aggregate value over a defined time period (e.g. they wish to determine the total sales for each one of a number of employees, over a given period of time), existing techniques require multiple scans of the table. In addition, prior art techniques require the determination of all non-overlapping time periods first before performing the aggregation of the values in the table.

SUMMARY

An optimization technique is provided that allows aggregation of data in a temporal database by performing only one scan of the database table. This is accomplished, for example, by determining whether two rows of information have a common grouping value. If so, both temporal overlap and temporal non-overlap components of the two rows are determined. Each of the temporal overlap components of the two rows is aggregated and each of the temporal non-overlap components of the two rows is separated.

In general, in one aspect, the invention features a method for aggregating data in a temporal database, where the method includes determining whether two rows of information have a common grouping value, and if so, determining both temporal overlap and temporal non-overlap components of the two rows, aggregating each of the temporal overlap components of the two rows, and separating the temporal non-overlap components of the two rows.

Implementations of the invention may include one or more of the following. The method may further include the temporal non-overlap components of the two rows being temporarily stored in separate rows in a temporary table. Moreover, the temporal overlap components of the two rows may be temporarily stored as an aggregate in a single row of a temporary table. A first component of the two rows of information may be held in the temporary table, and a second component of the two rows of information may be read from the temporal database table. The method may include the initial step of reading the first of the two rows of information from the temporal database table and saving the first of the two rows in the temporary table. The method steps may be iterated for all the rows in the temporal database table. At least one of the temporal non-overlapping components or the temporal overlapping components may be determined by comparing the difference between the respective periods of validity of each of the two rows. The step of aggregating each of the temporal overlap components of the two rows may be achieved by summing data elements in the two rows. When all rows of the database table have been read, the contents of the temporary table may be reviewed to coalesce the temporary table entries into a common grouping value and a common period of validity. The temporary table may be held in a cache memory. The data contents of the temporary table may be stored in the order of the grouping column value and the period of validity, respectively. The at least one temporal overlapping components may be determined in one step. The contents of the table may be reviewed in the order of the period of validity within each common grouping value.

In general, in another aspect, the invention features a database system for accessing a database. The database system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities; and an optimizer for optimizing a plan for executing a query to aggregate temporal information in a database table. If a query to aggregate information is invoked, the process determines whether two rows of information have a common grouping value, and if so, determines both temporal overlap and temporal non-overlap components of the two rows, aggregates each of the temporal overlap components of the two rows, and separates the temporal non-overlap components of the two rows.

In general, in another aspect, the invention features a computer program, stored on a tangible storage medium, for use in optimizing an aggregation of data in a temporal database. The program including executable instructions that cause a computer to which cause a computer to determine whether two rows of information have a common grouping value, and if so, determine both temporal overlap and temporal non-overlap components of the two rows, aggregates each of the temporal overlap components of the two rows, and separates the temporal non-overlap components of the two rows.

Other features and advantages will become apparent from the description and claims that follow.

DETAILED DESCRIPTION

Figure 1:
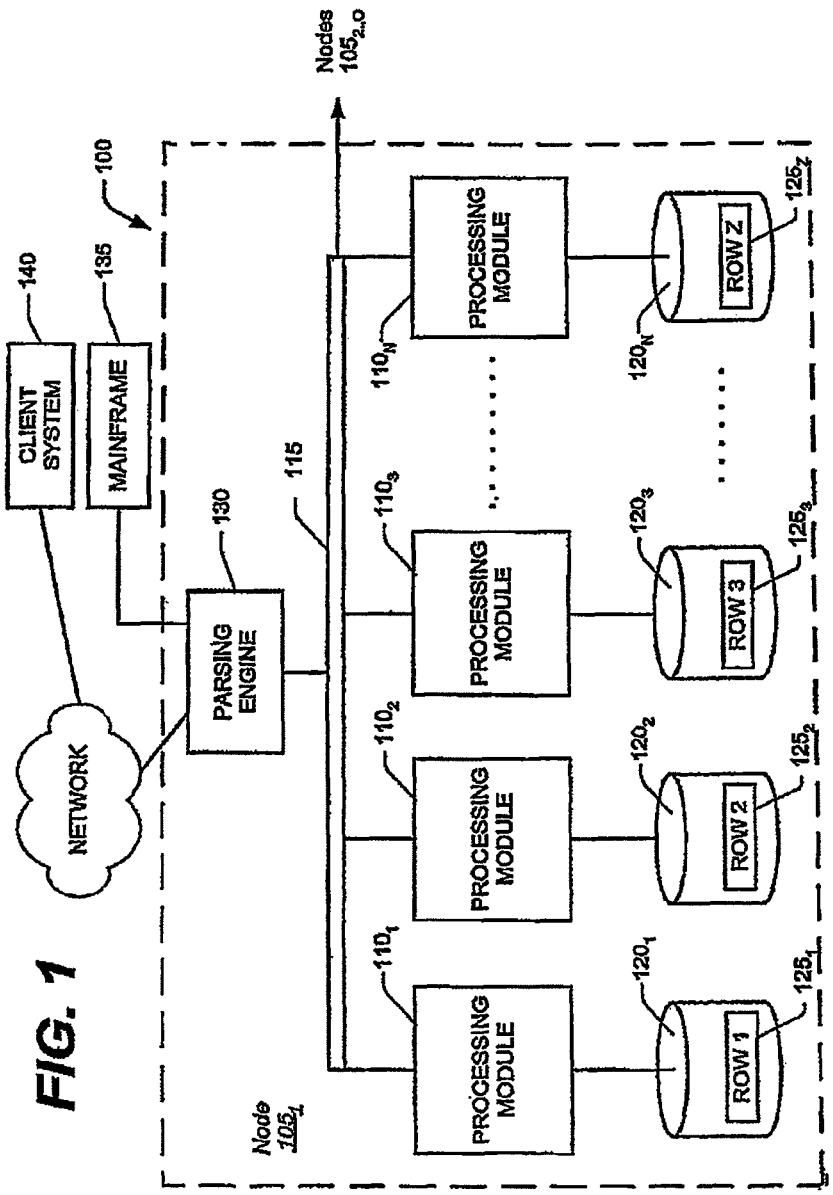
FIG. 1 is a block diagram of a node of a database system.

The temporal database aggregation method, database system and computer program disclosed herein has particular application to large databases that might contain many millions or billions of records managed by a database system ("DBS") 100, such as a Teradata Active Data Warehousing System available from Teradata Corporation. FIG. 1 shows a sample architecture for one node $105_1$ of the DBS 100. The DBS node $105_1$ includes one or more processing modules $110_{1 \ldots N}$, connected by a network 115 that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on each physical processor. If there are 8 virtual processors and 4 physical processors, the operating system would distribute the 8 virtual processors across the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries in a standard format, such as SQL.

Figure 2:
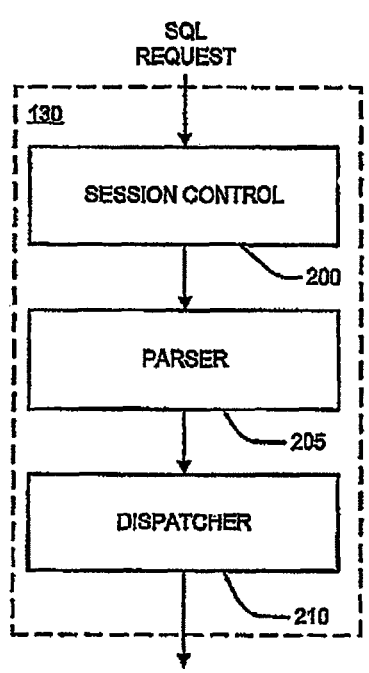
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
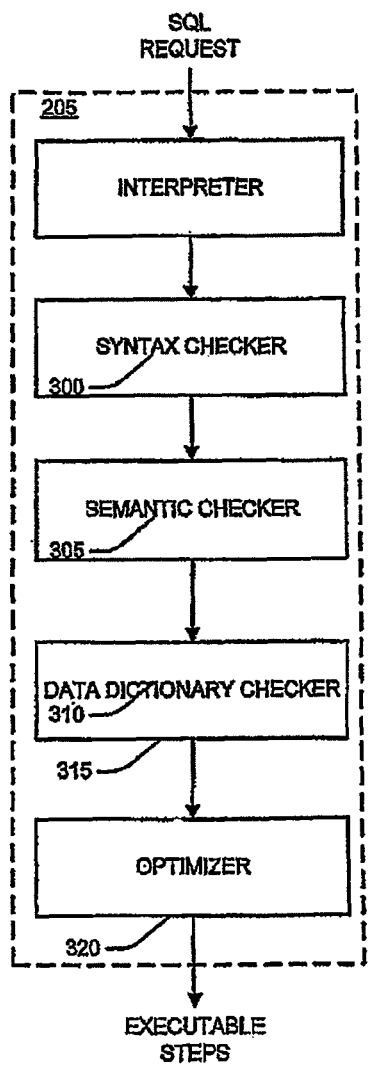
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks the request for correct SQL syntax (block 305), evaluates the request semantically (block 310), and consults a data dictionary to ensure that all of the objects specified in the SQL request exist and that the user has the authority to perform the request (block 315). Finally, the parser 205 runs an optimizer (block 320) that selects the least expensive plan to perform the request.

In the case where a user wishes to perform a temporal aggregation of data in a table, the optimizer (block 320) recognizes the query type and utilizes an algorithm or methodology in accordance with the embodiment disclosed herein. For example, the optimizer may recognize a sequenced aggregation query in the form:

"SEQUENCED VALID TIME SELECT x, SUM(y) FROM T1 group by x;"

The SQL query outlined above requires the database system to aggregate, according to time periods, all values of "y" for each common grouping value of "x". To continue with the simple example outlined in the Background section, the query above is a request from a user to group (aggregate) all values of "y" (sales of a product by an employee), over common time periods, and group the aggregated values according to a common grouping value "x" (each employee). Thus, to utilize the example, the required output would be a list of each employee, with aggregated sales figures of a product for each employee, split into defined time periods.

The algorithm to compute the temporal aggregation completes the aggregation to be performed by performing only one pass of the table. Before describing the algorithm in detail, it is instructive to clarify some terms utilized to describe the embodiment.

In the description herein, the terms "PV", "LDIFF" and "RDIFF" are utilized when referring to various temporal parameters and calculations. The term "PV" (Period of Validity) refers to the time period between the "start" time and the "end" time of any given row in a temporal database. That is, if the start time is Jan. 7, 2001 and the end time is Jan. 31, 2001 then the PV is the period from Jan. 1, 2007 to Jan. 31, 2007 (note that all dates in the specification are written in the yy/mm/dd format).

The terms LDIFF and RDIFF refer to the "difference" between two different PV's. "LDIFF" refers to the difference between PV's on the "left" side (i.e. the difference between the start dates) and RDIFF refers to the difference between PV's on the "right" side (i.e. the difference between end dates). Therefore, if a first PV is defined as the period from Jan. 1, 2007 to Jan. 31, 2007 and a second PV is defined as the period from Jan. 4, 2007 to Jan. 28, 2007, then LDIFF is the period from Jan. 1, 2007 to Jan. 4, 2007, and RDIFF is the period from Jan. 28, 2007 to Jan. 31, 2007. Of course, it will be understood that PV may be represented in a "non-date" format, such as by a single integer, or any other suitable representation. For example, in some cases, the value may also be NULL.

Returning to the description of the embodiment, an algorithm in accordance with the embodiment operates in accordance with the flow charts 400a, 400b, 400c and 400d of FIGS. 4a, 4b, 4c and 4d respectively. Firstly, an aggregate cache is formed (in memory) (402), such that each row in the aggregate cache has an additional field arranged to hold a value that represents the Period of Validity (PV) of the aggregated row. This field is provided in addition to a field that holds a value which identifies the grouping set (where necessary) and a field that holds the aggregated value.

Once the aggregated cache has been formed, a first row of the table is read and placed in the cache (404), to become the aggregate cache row.

Figure 4A:
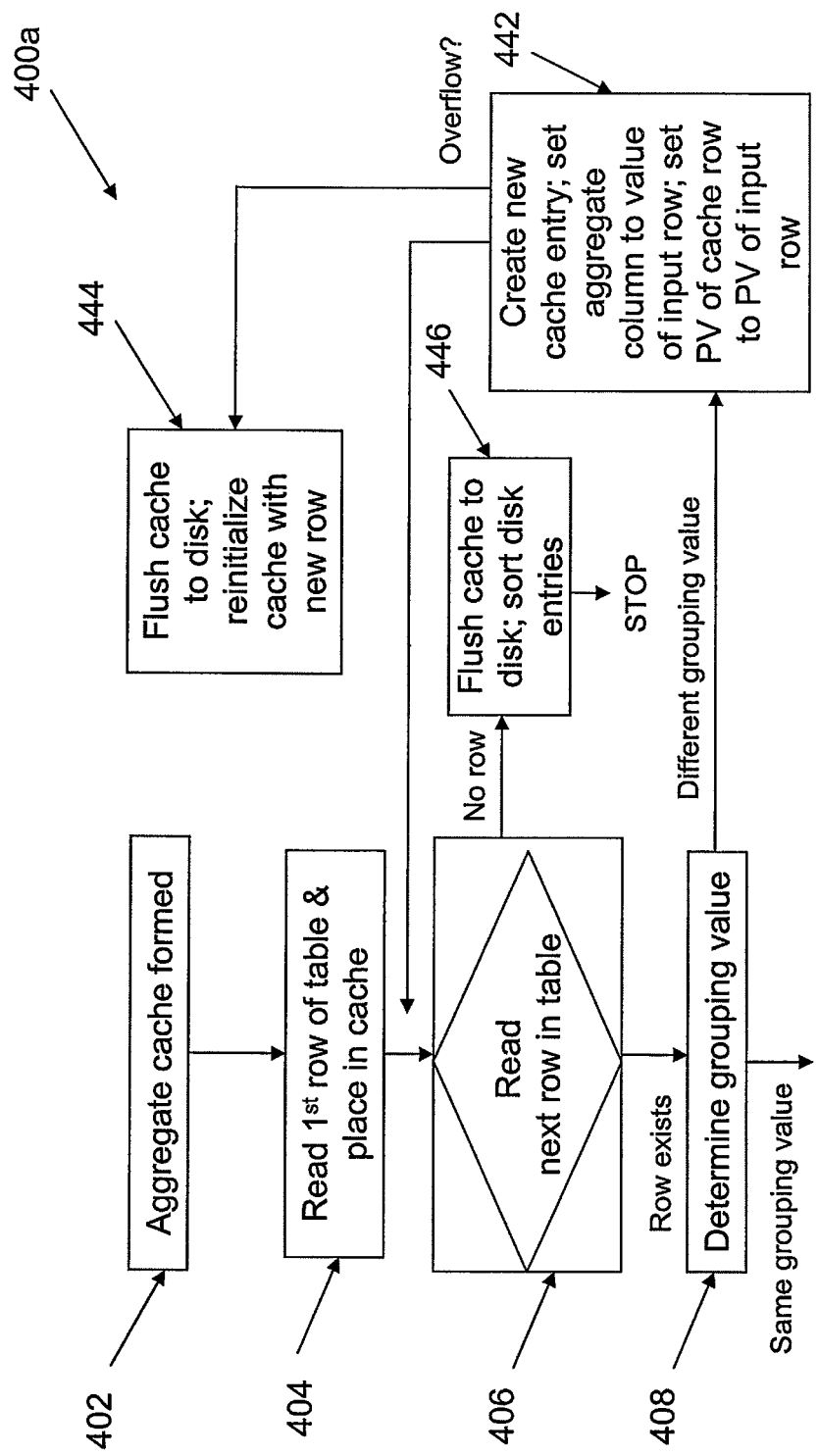
FIGS. 4a, 4b, 4c and 4d are flow charts of a temporal aggregation technique.
Figure 4B:
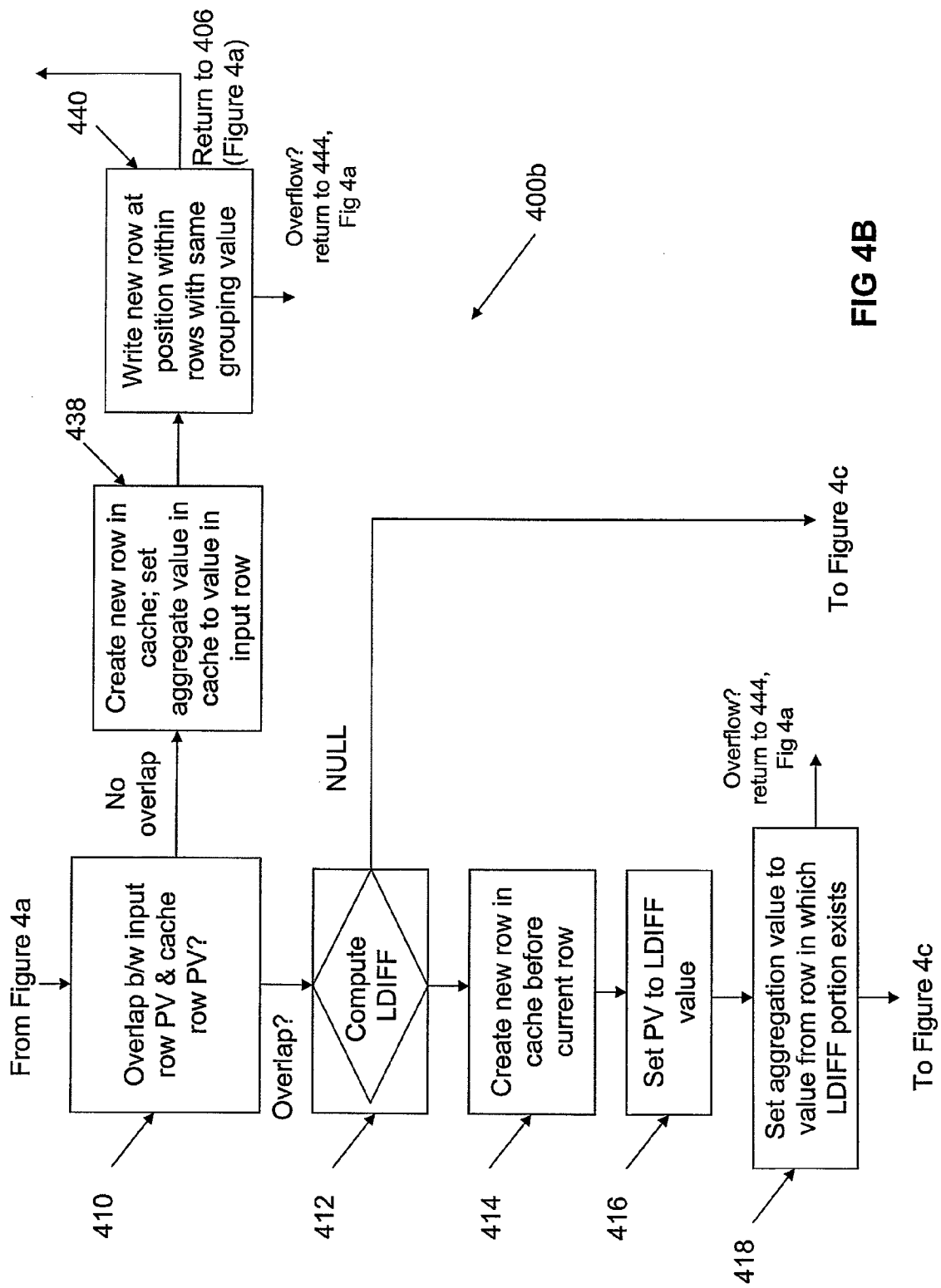
Figure 4C:
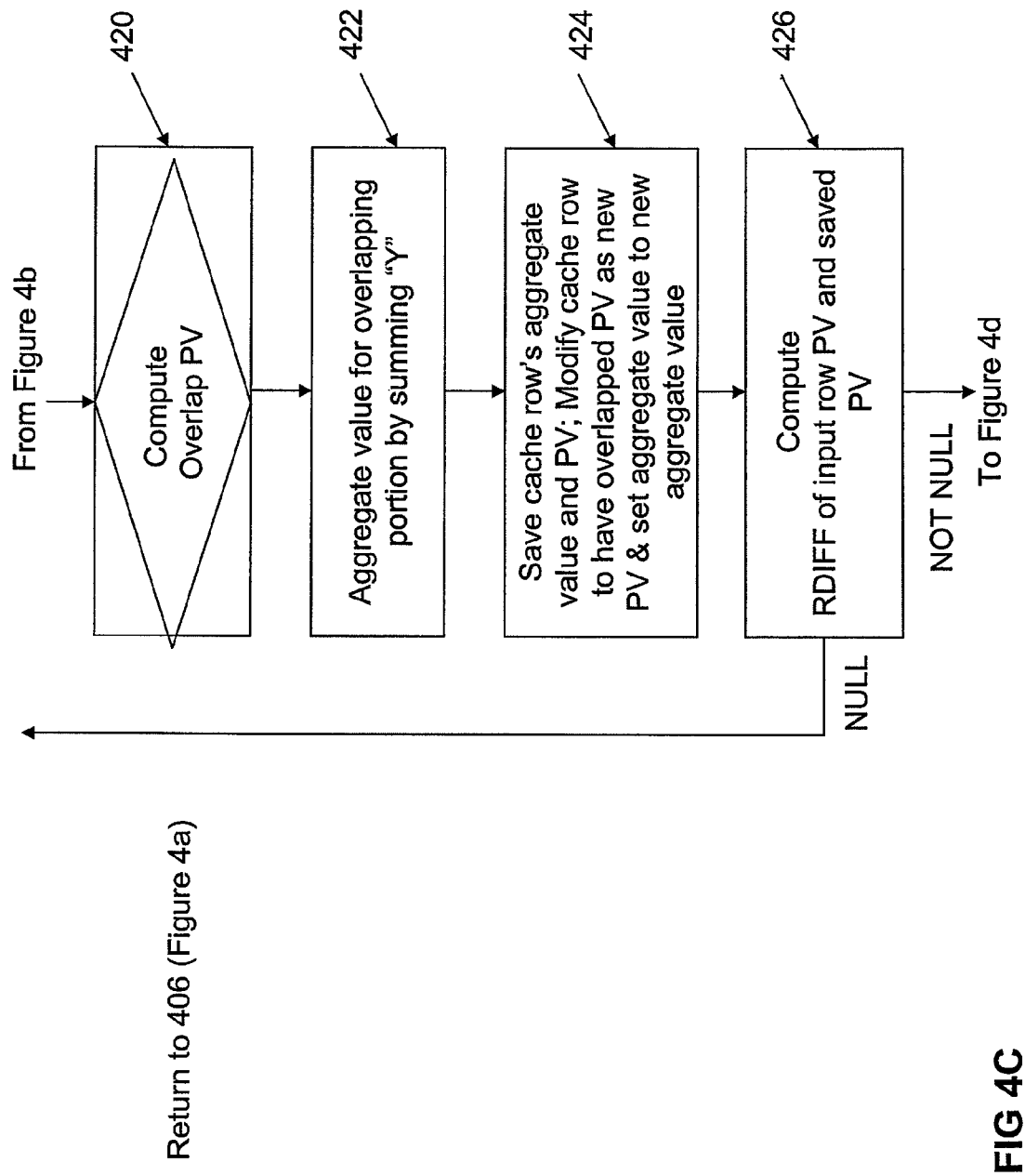
Figure 4D:
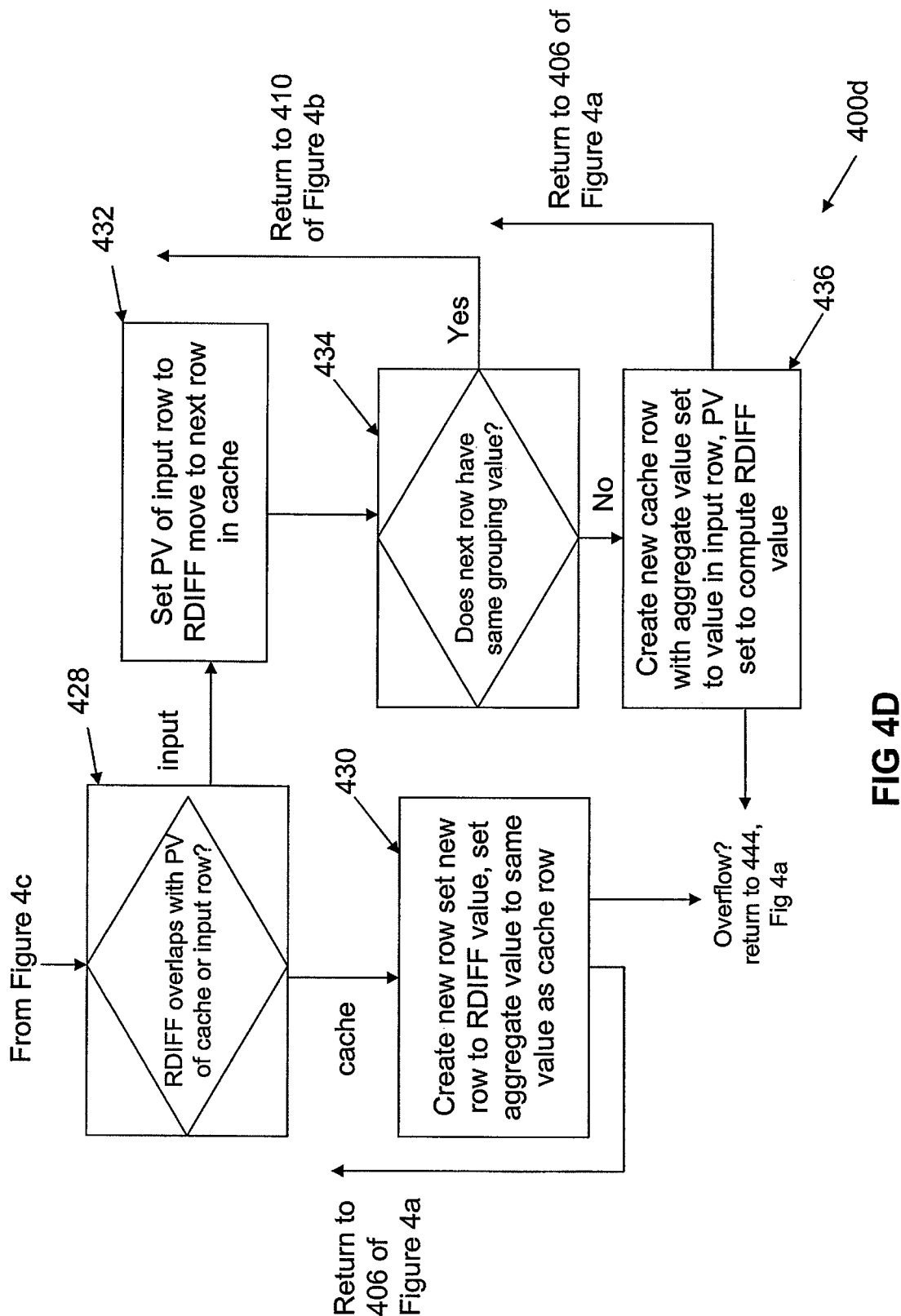

A. Read the next row from the table as the input row (406). Do the following if row exists:

B. Position in the cache to the row with the same grouping value. If there is such a row (408) the method steps in accordance with FIGS. 4b, 4c, and 4d are carried out:

1. Determine the PV of the input row and whether it overlaps with the PV of the aggregate cache row (410). If so, then:
   a. Compute the LDIFF (i.e. the start time difference) of the two PVs (412). If the LDIFF value is NULL, move to step b (FIG. 4c). Else, create a new row in the cache before the current row (414) and set the PV in the new row to the LDIFF value (416). Set the aggregation value in the new row to the column value taken from the row in which LDIFF portion exists (418).
   b. Compute the overlapped PV of the two rows (420 of FIG. 4c). Calculate the new aggregate value for the overlapping portion by summing the values of "y" (422). Save the cache rows aggregate value and its PV. Modify the cache row to have the overlapped PV as the new PV and set the aggregate value to the new aggregate value (424).
   c. Compute the RDIFF of the input row PV and the saved PV from step b (426). If RDIFF is NULL return to reading the next row in the table (return to 406, at FIG. 4a).
   d. Otherwise, determine if RDIFF overlaps with the saved PV of the cache row or the input row (428 of FIG. 4d). If RDIFF overlaps the saved PV of the cache row, then create a new row in the aggregate cache, set the PV of the new row to the RDIFF value and set the aggregate value of the new row to the saved aggregate value from step b (430), then return to reading the next row in the table (406 of FIG. 4a). If RDIFF overlaps with the PV from the input row, set the PV of the input row to the RDIFF value, and move to the next row in the cache (432). Determine the grouping value of the next row (434). If the next row has the same grouping value, then return to the beginning of step 1 (410 of FIG. 4b) with the modified input row as the new input row. If the grouping values are different then create a new cache row with the aggregate value set to the value in the input row and PV set to the computed RDIFF value (436). Return to read the next input row from the disk (406 of FIG. 4a).

2. If the PV of the input row does not overlap with the PV of any of the aggregate cache rows with the same grouping value (referring back to 410 of FIG. 4b):
   a. Create a new row in the cache with the PV of the input row and set the aggregate value in the cache to the value in the input row (438); and
   b. Write the row in the cache at the position such that the newly inserted row is in the ascending order on the PV value within the rows that have the same grouping value (440).
   c. Return to read the next input row from the disk (406 from FIG. 4a)

C. If there are no rows with the same grouping column value in the cache create a new cache entry with the value of the aggregate column set to the column value of the input row and set the PV of the cache row to the PV of the input row (442). Return to read the next input row from the disk (406 from FIG. 4a)

At any point in the above processing flow if the cache becomes full then the cache can be flushed to disk, the cache re-initialized with the new row inserted to cache (444), and the resultant disk entries are sorted into the following order—grouping columns, beginning value of the PV and ending value of the PV (446).

When all the input rows are exhausted, then the cache can be flushed to disk, and the resultant disk entries are sorted in the following order—grouping columns, beginning value of the PV and ending value of the PV.

Figure 5A:
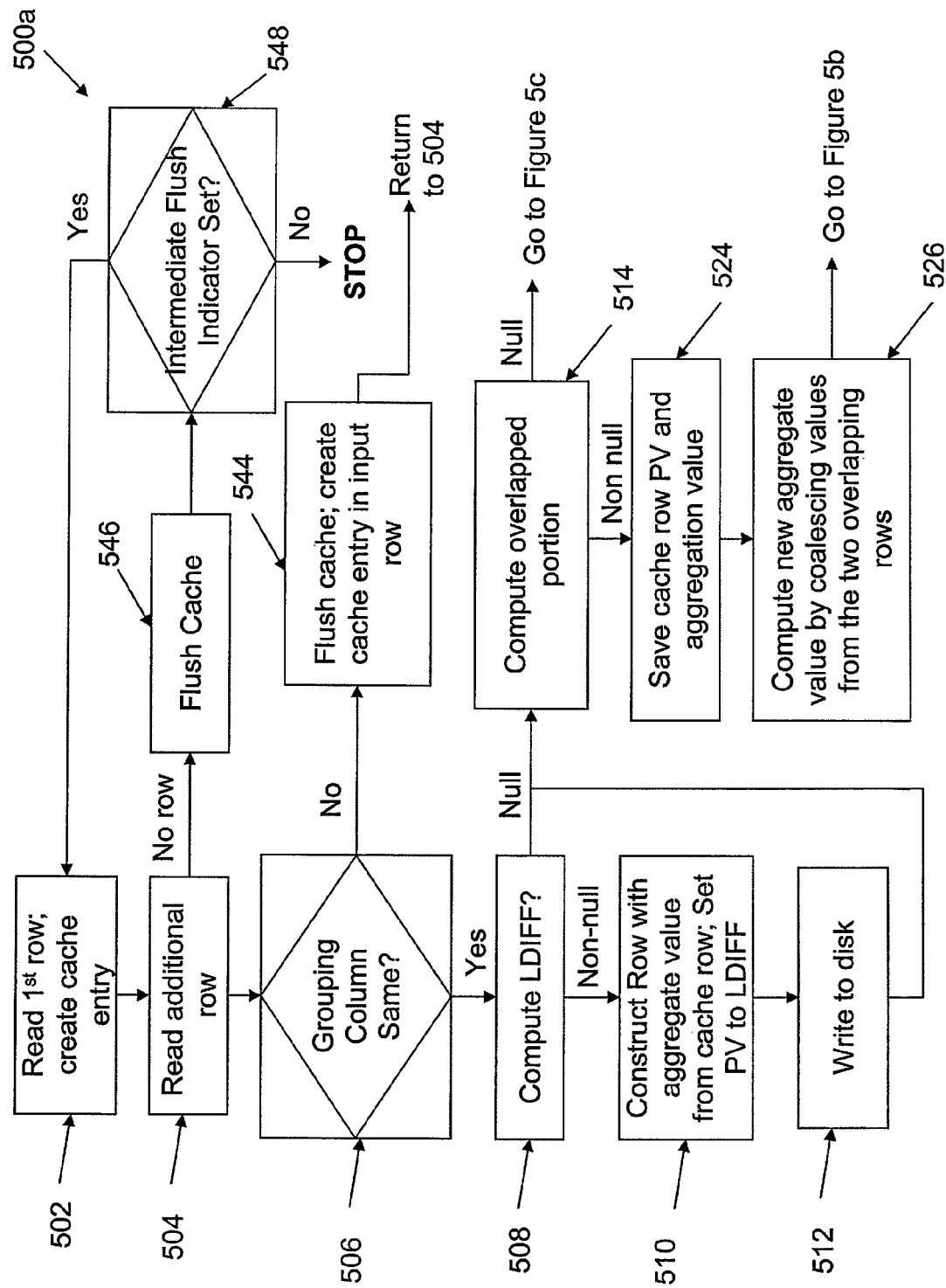
FIGS. 5a, 5b and 5c are flow charts for ordering a table which has been temporally aggregated.
Figure 5B:
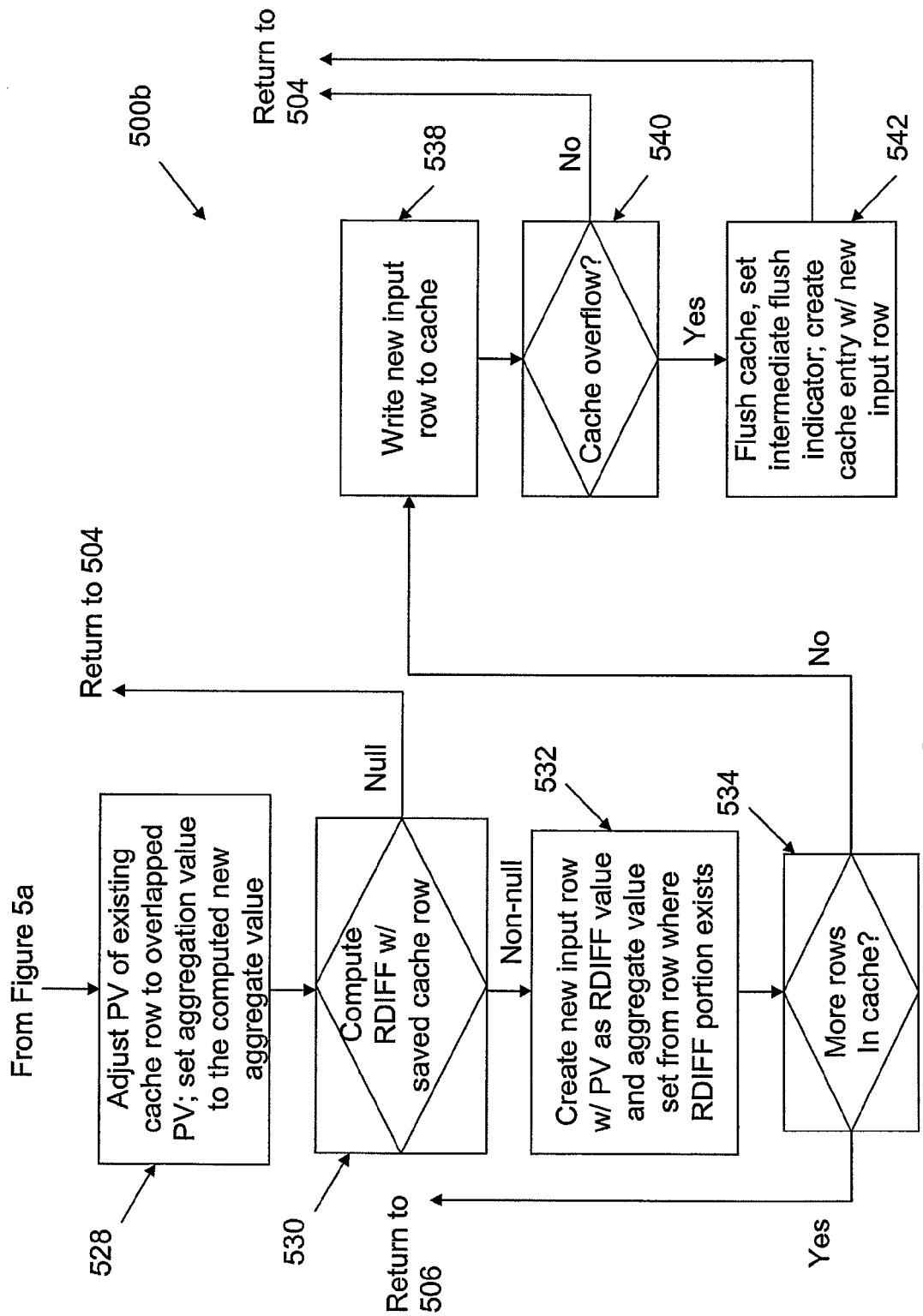
Figure 5C:
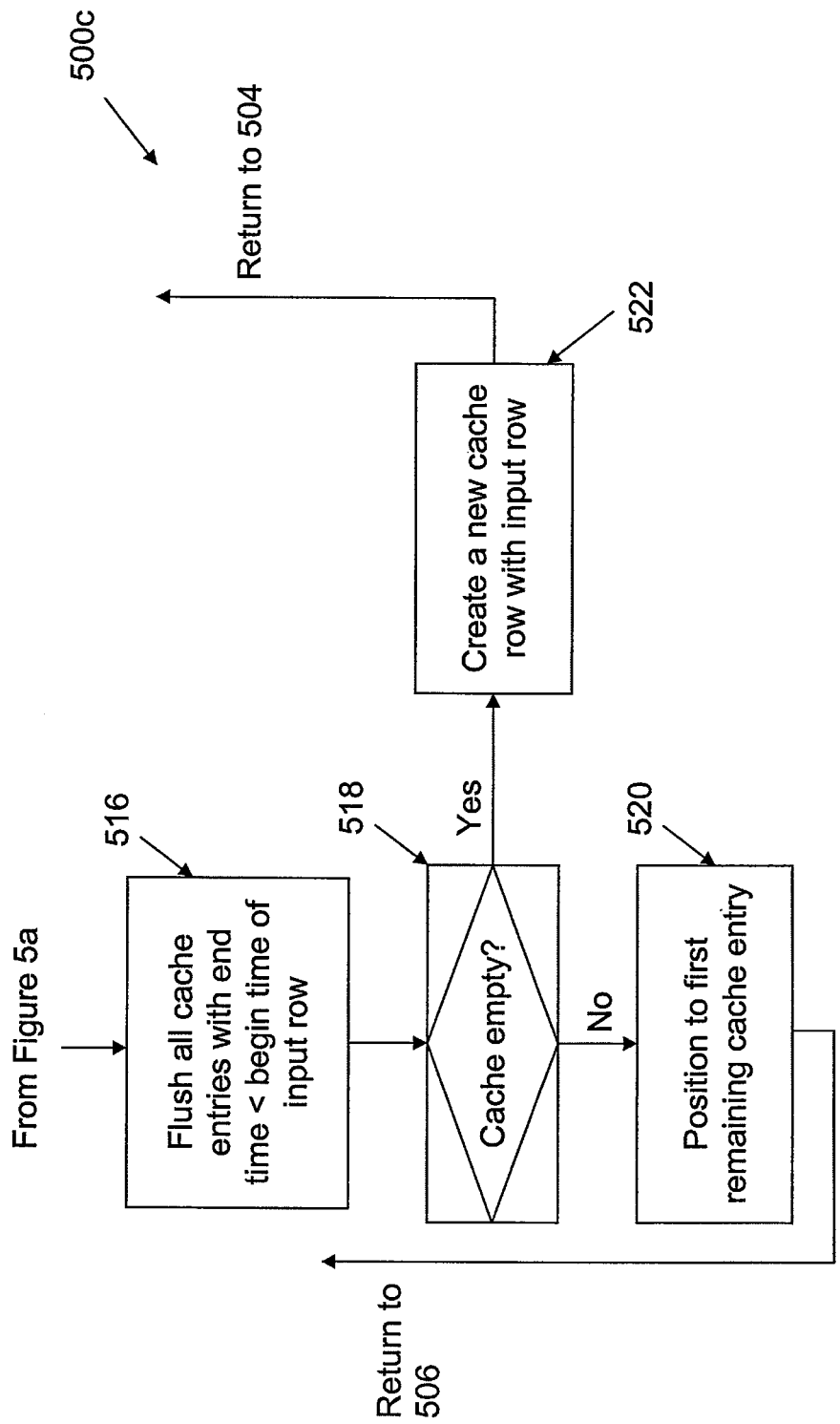

The temporal aggregation of rows that have been flushed to disk in sorted order from the cache, is performed utilizing the algorithm described with reference to flow charts 500a, 500b, 500c of FIGS. 5a, 5b, and 5c. The first row is read and a cache entry is created from the first row (502). Values are then coalesced on the grouping column and PV column by reading the next row from the disk (504). If there is no next row, then go to step 8, otherwise with the next row that has been read do:

1. If the grouping columns are the same (506), then do the following. Otherwise go to step 7 below (544).
2. Compute LDIFF (508). If LDIFF is not NULL, then construct a row with the aggregate value from the cache row and set the PV to LDIFF (510). Write this new row to disk (512).
3. Compute the overlapped portion of the PVs (514) If overlapped portion is NULL, flush all entries from cache whose end time is earlier than, and not the same as, the begin time of the input row (516). If cache is empty (518) then create a cache row with this row (522), return to 504. Else cache is not empty, position to the first remaining entry in the cache (520) and return to 506
4. Save the old cache row PV and aggregation column value (524). Compute the new aggregation value by coalescing the overlapping two row values (526). Adjust the PV of the existing cache row to the overlapped PV and set the aggregate value of the existing cache row to the computed new aggregation value (528).
5. Compute the RDIFF (530) of the input row and the saved cache row PV. If RDIFF does not exist, then return to read the next row from the disk (return to 504). Otherwise create a new row called the new input row (532). If the RDIFF overlaps with the saved cache row PV then set the aggregation column value of the new input row from the saved cache row and set its PV to the RDIFF value. If the RDIFF overlaps with the input row then set the aggregation column value of the new input row from the old input row and set its PV to the RDIFF value.
6. Determine if there are more rows in the cache with the same grouping value (534). If so, then iterate using the new input row from step 5, starting at step 1 (506). Otherwise, write the new input row to cache (538). If the cache overflows (540) then flush the cache with an indicator that there has been an intermediate flush with the same grouping value and reinitialize the cache with the new input row (542). Return to 504.
7. Flush the existing cache entries and create a new cache entry with value from the input row (544) and go to 504.

8. If there are no more input rows, flush the cache (546).
9. If there has been an intermediate flush (548) then return to 502. Otherwise stop.

The method of aggregation is further explained with reference to a simplified example. In the example, there is provided a table (Table 1) which contains three columns x, p and y and two further columns which define a valid start and end time for each value of x, p, y. In other words, the x column represents the grouping column value (e.g. an employee name), the p column represents the product id (identification code) and the y column represents a value to be aggregated based on the grouping value x and the Period of Validity (PV) (e.g. the total number of a particular product sold by a particular employee over a defined time period). The start and end columns represent the Period of Validity (PV) of the row.

Table 1 is reproduced below:

TABLE 1

Sample "temporal" table, where values x, p and y have associated start and end dates

| x | p | y | start | End |
|---|---|---|---|---|
| 1 | 10 | 1 | 04/01/01 | 04/01/31 |
| 1 | 20 | 2 | 04/01/01 | 04/12/31 |
| 1 | 30 | 3 | 04/01/01 | 04/01/15 |
| 2 | 10 | 1 | 04/01/01 | 04/01/31 |
| 2 | 20 | 2 | 04/01/01 | 04/12/31 |
| 2 | 30 | 3 | 04/01/01 | 04/01/15 |

Is evaluated as follows: For x-value 1, the first period (Jan. 1, 2004 to Jan. 15, 2004) overlaps with the periods of the first three rows in the input table. Hence, all the three y-values should to be added to get 6 as the sum y-value for the x-value and for this period. This is performed for each unique period and for each x-value.

The aggregation will produce the table shown in Table 2. The start and end columns represent the PV of the output rows.

TABLE 2

Temporal aggregation (sum y)

| x | sum y | start | end |
|---|---|---|---|
| 1 | 6 | 04/01/01 | 04/01/15 |
| 1 | 3 | 04/01/15 | 04/01/31 |
| 1 | 2 | 04/01/31 | 04/12/31 |
| 2 | 6 | 04/01/01 | 04/01/15 |
| 2 | 3 | 04/01/15 | 04/01/31 |
| 2 | 2 | 04/01/31 | 04/12/31 |

At least the embodiment described herein provides a number of advantages over a conventional temporal aggregation technique. Firstly, only one scan of the input table is required to complete the operation, and moreover, there is no necessity to pre-compute the periods of validity for the rows in the table. This results in a lower computation (CPU) time, and therefore a faster response time.

Advantageously, the algorithm in accordance with the embodiment is also scalable. The algorithm provides greater efficiency for a large number of input rows and large periods of validity (e.g. where the values only change slowly over time).

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A computer-implemented method for aggregating information in a temporal database table that includes one or more time values defining a time period for information stored in the temporal database table, where the method includes:
   determining, by one more processor of a computer, whether two rows of information in a database table of the temporal database have a common grouping value, associated with the one or more particular time values defining the time period, for the aggregating of the information in the two rows of temporal database table stored by data elements of the two rows for the common grouping value, wherein each one of the two rows of information includes data for the same column of the database table and a particular time value defining a particular time period when the data is valid; and
   if so, determining, by the one more processor of the computer, both temporal overlap and temporal non-overlap components of the of the respective time periods of the two rows in the temporal database, aggregating each of the temporal overlap components of the of the respective time periods of the two rows at least by summing the data elements in the two rows, and
   separating, by the one more processor of the computer, the temporal non-overlap components of the respective time periods of the two rows, wherein the temporal non-overlap components of the two rows and the temporal overlap components of the two rows are stored in separate rows at least temporarily in a temporary table to facilitate the aggregating on the information; and
   iterating by the one more processor of the computer the method steps for all the rows in the temporal database table; and
   when all rows of the database table have been read, reviewing the contents of the temporary table to coalesce the temporary table entries by a common grouping value and a common period of validity.

2. The method of claim 1, wherein the temporal overlap components of the two rows are temporarily stored as an aggregate in a single row of a temporary table.

3. The method of claim 1, wherein the temporal overlap components of the two rows are temporarily stored as an aggregate in a single row of a temporary table.

4. The method of claim 2, wherein a first of the two rows of information is a row of information held in the temporary table, and a second of the two rows of information is read from the temporal database table.

5. The method of claim 2, further including the initial step of reading the first of the two rows of information from the temporal database table and saving the first of the two rows in the temporary table.

6. The method of claim 1, further including the initial step of reading the first of the two rows of information from the temporal database table and saving the first of the two rows in the temporary table.

7. The method of claim 1, further including the step of iterating the method steps for all the rows in the temporal database table.

8. The method of claim 1, further including the step of determining at least one of the temporal non-overlapping components or the temporal overlapping components by comparing the difference between the respective periods of validity of each of the two rows.

9. The method of claim 8, wherein the at least one temporal overlapping components are determined in one step.

10. The method of claim 1, wherein the contents of the temporary table include storing the data in the order of the grouping column value and the period of validity, respectively.

11. The method of claim 1, wherein the contents of the table are reviewed in the order of the period of validity within each common grouping value.

12. The method of claim 1, wherein the temporary table is held in a cache memory.

* * * * *